United States Patent [19]

Lathrop et al.

[11] Patent Number: 5,097,427
[45] Date of Patent: Mar. 17, 1992

[54] TEXTURE MAPPING FOR COMPUTER GRAPHICS DISPLAY CONTROLLER SYSTEM

[75] Inventors: Olin G. Lathrop, Groton; Douglas A. Voorhies, Framingham, both of Mass.; David B. Kirk, South Pasadena, Calif.

[73] Assignee: Hewlett-Packard Company, Palo Alto, Calif.

[21] Appl. No.: 679,152

[22] Filed: Mar. 26, 1991

Related U.S. Application Data

[63] Continuation of Ser. No. 215,620, Jul. 6, 1988, abandoned, which is a continuation-in-part of Ser. No. 77,202, Jul. 24, 1987.

[51] Int. Cl.$^5$ .............................................. G09B 9/08
[52] U.S. Cl. .................................................. 395/130
[58] Field of Search ..................... 364/518, 521, 522; 340/703, 721, 747, 750, 701, 707

[56] References Cited

U.S. PATENT DOCUMENTS 4,225,861 9/1980 Langdon, Jr. et al. ............. 340/703
4,475,161 10/1984 Stock ................................... 364/521
4,564,915 1/1986 Evans et al. ........................ 364/521
4,590,463 5/1986 Smollin ............................... 340/703
4,615,013 9/1986 Yan et al. ............................ 364/521
4,710,806 12/1987 Iwai et al. ............................ 358/81

OTHER PUBLICATIONS

Williams, L., "Pyramidal Parametrics", *Computer Graphics*, vol. 17, No. 3, Jul. 1983, pp. 1–11.
Rogers, D., Procedural Elements for *Computer Graphics*, McGraw-Hill, 1985, pp. 354–363.
Oka, M. et al., "Real-Time Manipulation of Texture-Mapped Surfaces", *Computer Graphics*, vol. 21, No. 4, Jul. 1987, pp. 181–188.

Primary Examiner—Heather R. Herndon
Attorney, Agent, or Firm—Richard Schuette

[57] ABSTRACT

Texture mapping apparatus includes a memory for storing input texture values, interpolators for generating illumination values for sets of display pixels, elements for addressing the memory to generate output texture values, and logic elements for combining the output texture values and the illumination values to generate display color values for each pixel.

12 Claims, 4 Drawing Sheets

TEXTURE MAPPING FOR COMPUTER GRAPHICS DISPLAY CONTROLLER SYSTEM

REFERENCE TO RELATED APPLICATION

This is a continuation of copending application Ser. No. 0/215,620 filed on 6 July 1988 now abandoned. which application is a continuation-in-part of U.S. patent application Ser. No. 077,202, assigned to Apollo Computer, Inc.

BACKGROUND OF THE INVENTION

The present invention relates generally to the field of digital computers, and in particular, relates to apparatus for controlling computer graphics displays.

An important application of computer graphics involves the creation of realistic images of three dimensional objects. Designers of three dimensional objects such as automobiles, aircraft and other structures may wish to have a visual representation of a preliminary design, to facilitate implementation of interactive design changes prior to the prototype stage. Creating realistic computer generated images is a faster, less expensive and more effective method of evaluating preliminary designs than is constructing models and prototypes. In particular, computer generated images allow a greater number of alternative designs to be evaluated in a shorter time period. Often, the design work itself is performed on a computer system, using a computer aided design (CAD) or other engineering workstation. In such a case, a digitized representation of the three dimensional object is already available to use as the basis for the computer generated image.

Simulation systems are another application for computer generated three dimensional images. Such systems utilize images which not only must appear realistic, but which also must change dynamically.

One approach which helps produce visual realism in computer generated images is that of surface shading. Variations in surface shading add visual information of the type normally found in a visual environment, so that an observer's depth perception mechanisms can properly resolve any ambiguities caused when three dimensional objects are projected into two dimensions. Shaded image generation is therefore an important capability of modern graphics workstations. Moreover, engineers and designers utilizing such workstations seek "solid-looking" models to convey more shape information. Shaded image generation helps create realistic solid-looking models.

Realism in computer generated images is also enhanced by surface detail, referred to as "texture." In computer graphics, "texture" is generally considered to subsume two aspects. The first aspect of texture is adding the appearance of roughness to a smooth surface. Incorporating the appearance of roughness to a surface is primarily a mathematical normal vector perturbation operation. The second aspect is the addition of a separately specified pattern to a smooth surface. After the pattern is added, the surface still appears smooth. Adding a pattern to a smooth surface in this way is largely a mapping operation, referred to as "texture mapping."

Texture mapping is an important technique in computer graphics and several methods have been developed for implementing texture mapping. One such method is described in "*Real-Time Manipulation of Texture Mapped Surfaces,*" Oka, et al, Computer Graphics, Volume 21, No. 4, pp, 181-188, 1987. Texture mapping is also discussed generally in Rogers, David F., "*Procedural Elements For Computer Graphics,*" McGraw-Hill, 1985, pp. 354-363.

Because the basis of adding texture patterns to three dimensional surfaces is a mapping operation, texture mapping involves a transformation from one coordinate system to another. In Particular, these coordinate systems can be referred to as texture space, object space, and image space. The texture pattern is defined in a two-dimensional coordinate system (u,v) in texture space, the three dimensional surface is defined in a three-dimensional coordinate system (x', y', z') in object space and the output display screen is defined in a two-dimensional coordinate system (x,y) in image space. Thus, conceptually, texture mapping transforms a texture plane. (u,v) onto a three dimensional surface, (x', y', z'), and then projects the transformed texture plane into the output display screen coordinate system (x,y).

An example of conventional texture mapping is a computer graphics rendering of the label on a soft drink can. An image of the "unrolled" label must first be generated. The "unrolled" label is defined in texture space. Next, the form of the can is rendered in object space. Conventionally, the cylindrical form of the can is rendered by generating a set of polygons. The geometrical form of the can is thus defined in object space. The texture (unrolled label) is transformed onto the three dimensional surface representation in object space (the cylindrical form), and then is projected into image space (the output display screen). The color and intensity of each picture element (pixel) in the display is accordingly a function of the transformation of the texture into object space and the mapping from object space into image space.

Prior art texture mapping methods are computationally intensive, requiring the calculation of large groups of values. Moreover, most prior art texture mapping methods exist in exclusively software implementations, requiring the execution of multiple-cycle program steps. Conventional texture mapping systems are therefore slow and require considerable processor and memory resources.

There accordingly exists a need for texture mapping methods and apparatus for computer graphics display controller systems that can execute texture mapping at high speed, with minimum cost, complexity and processor and memory overhead.

It is thus an object of the invention to provide improved texture mapping apparatus.

It is a further object of the invention to provide texture mapping apparatus which can execute texture mapping in real time.

It is another object of the invention to provide an efficient and inexpensive system for texture mapping, utilizing interpolation techniques.

Other general and specific objects of the invention will in part be obvious and will in part appear hereinafter.

SUMMARY OF THE INVENTION

These objects are attained by the invention, one aspect of which provides texture mapping apparatus for use in a computer graphics display controller system for processing pixel values to display an image of an object. The texture mapping apparatus includes texture storage elements for storing an indexed set of input texture values representative of a selected texture pattern. Each texture value in the indexed set of texture values corresponds to an associated display pixel address.

The invention also includes "illumination value" interpolation elements for generating "illumination values," each "illumination value" corresponding to an associated display pixel. The term "illumination value" as used herein includes, but is not limited to, alpha, red, green and blue values familiar to those skilled in the art. The invention further includes texture storage addressing elements for addressing the texture storage elements to generate an output texture value corresponding to a selected display pixel. The invention provides combining elements responsive to the output texture values and the illumination values for arithmetically combining the output texture values and the illumination values corresponding to the selected display pixel to generate a display color value for the selected display pixel.

Texture mapping apparatus according to another aspect of the invention includes illumination value elements, responsive to selected addresses corresponding to selected display pixels, for generating illumination values corresponding to respective ones of the display pixel addresses. This aspect of the invention also includes polynomial logic elements, responsive to the selected pixel addresses, for calculating a polynomial texture index value for each selected pixel address, each texture index value being associated with a respective texture value for each selected pixel address. The invention also includes combining elements, responsive to the illumination values and the texture index values, for arithmetically combining respective ones of the illumination values and the texture values to generate display color values for the selected pixels.

In accordance with a further aspect of the invention, the illumination value elements include illumination interpolation elements for interpolating initial illumination values to generate other illumination values.

In another aspect of the invention, the polynomial logic elements include elements for calculating polynomials of less than or equal to order two, and incremental evaluation elements for executing incremental evaluation of the polynomials.

In a further aspect of the invention, the bit-map data interpolation elements include texture index interpolation elements for generating the texture index values. Additionally, the incremental evaluation elements include forward differencing elements for evaluating the selected polynomials.

Another aspect of the invention provides texture mapping apparatus including bit-map data value elements, responsive to selected addresses corresponding to selected display pixels, for generating illumination values corresponding to respective ones of the display pixel addresses. This aspect of the invention also provides texture table elements for storing texture values indexed by polynomial functions of the selected pixel addresses. The texture table elements include mip-map elements for storing indexed differently scaled mappings of the texture values. The differently scaled mappings are selected by at least one texture table parameter. This aspect of the invention further provides combining elements, in electrical circuit with the illumination value elements and the texture table elements, for arithmetically combining respective ones of the illumination values and the texture values associated with a selected one of the differently scaled mappings to generate display color values for the selected pixels.

The invention also includes partial derivative elements, in electrical circuit with the texture table elements, for computing partial derivatives of the at least one texture table parameter with respect to the selected pixel addresses. In conjunction with the partial derivative elements, the invention provides scaling elements, in electrical circuit with the partial derivative elements and the texture table elements, for selecting, responsive to the computed partial derivatives, one of the mappings of the texture values for transmitting texture values to the combining elements.

In one aspect of the invention, the texture table elements include limiting elements for selectively limiting the range of mappings selectable by said at least one texture table parameter.

In another aspect of the invention, the polynomial logic elements include non-incremental evaluation elements for executing non-incremental evaluation of the selected polynomials.

In a further aspect of the invention, the non-incremental evaluation elements include elements for executing direct evaluation of the selected polynomials. This aspect of the invention provides elements for executing spline functions utilizing values of selected control points.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
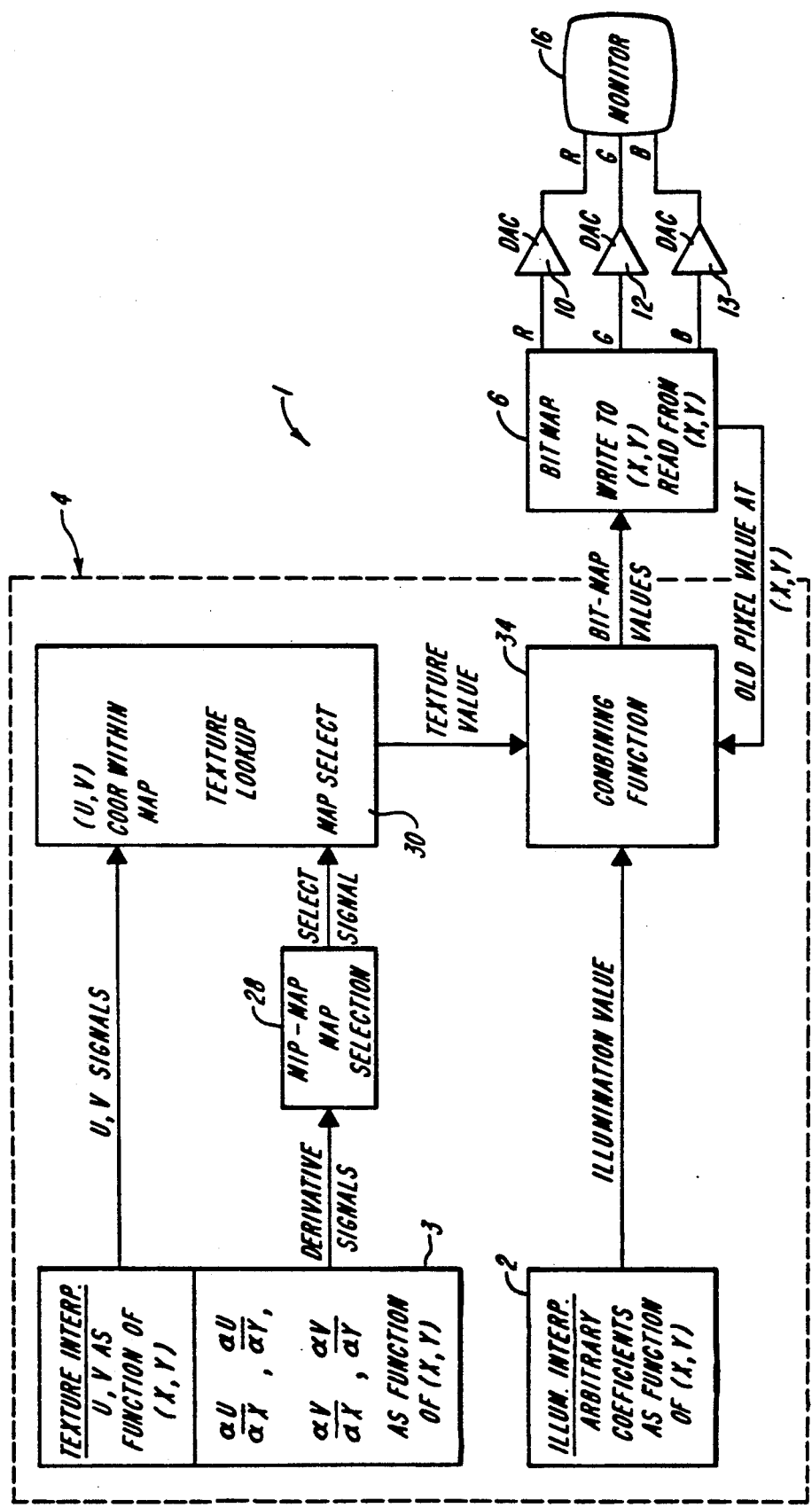
FIG. 1 a block diagram of a display controller system incorporating texture mapping apparatus according to the invention.

FIG. 1 is a block diagram of a display controller system 1 incorporating a texture mapping processor 4 according to the invention. The texture processor 4 includes an interpolation module 2 for generating selected coefficients representative of "illumination values." The term "illumination values" as used herein includes, but is not limited to, alpha, red, green and blue values familiar to those skilled in the art. These illumination values are a function of the X and Y address values (X,Y) for display pixels mapped into bitmap 6 and displayable on monitor 16. Thus, the illumination values generated by interpolation module 2 include alpha, red, green and blue ($\alpha$, R, G, B) values for pixels mapped into bitmap 6 and displayable on monitor 16.

Texture processor 4 also includes a texture parameter interpolation section 3 for generating, in a manner discussed in greater detail below in connection with FIG. 5, texture table parameters (U,V) and derivative signals dU/dX, dU/dY, dV/dX, and dV/dY. The derivative signals and parameters U and V are a function of pixel address (X,Y).

The U and V signals generated by texture parameter interpolation module 3 are asserted as a (U,V) address into a texture lookup table module 30. Texture lookup table module 30 preferably stores multiple texture lookup tables, as explained in detail below. Simultaneously, the derivative signals generated by texture parameter interpolation module 3 are transmitted to a map selector module 28, which reads the derivative signals and generates a MAP SELECT signal asserted as an input of texture lookup table module 30.

Texture lookup table module 30 utilizes the (U,V) and MAP SELECT signals, in a manner discussed in greater detail in connection with FIG. 5, to generate texture values which are asserted at one input of combining element 34. Illumination values generated by illumination interpolation module 2 are transmitted to another input of combining element 34.

Combining element 34, described in greater detail below in connection with FIG. 5, arithmetically combines texture values from texture lookup table module 30 with illumination values from illumination interpolation module 2 to generate final bitmap values which are written or mapped into corresponding (X,Y) addresses in bitmap 6. Additionally, bitmap values at (X,Y) locations in bitmap 6 are fed back to combining element 34 for selected processing, as described in greater detail below in connection with FIG. 5. In one embodiment of the invention, bitmap module 6 includes conventional video random access memory devices (VRAMs).

Bitmap values stored in bitmap 6, including $\alpha$, R, G, B values, can be, for example, read out of bitmap 6 in a conventional manner, such as by a shift-read process if VRAMs are utilized, and transferred to digital to analog converters (DACs) 10, 12 and 14, respectively. The output analog signals from DACs 10, 12 and 14 can be transmitted to a conventional monitor 16 and converted into tangible form. Those skilled in the art will appreciate that the invention can be advantageously practiced in connection with a variety of multiplexing and color lookup table configurations or paths, and that the above described configuration is but one example of a preferred implementation of the invention.

In a further preferred embodiment of the invention, interpolation module 2 generates illumination values from a small number of selected initialization or "set-up" values. Illumination interpolation module 2 utilizes these values to generate further illumination values corresponding to other display pixels. In particular, both texture parameter interpolation module 3 and illumination interpolation module 2 utilize interpolation techniques which are described in greater detail in U.S. patent application Ser. No. 077,202, assigned to Apollo Computer, Inc., attached hereto as Appendix A and incorporated herein by reference.

Figure 2:
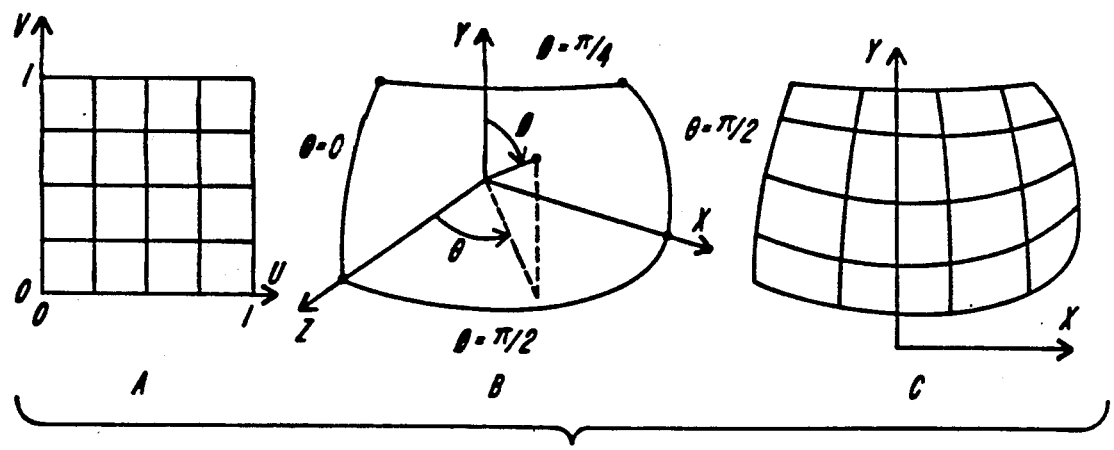
FIG. 2 depicts the conceptual basis of mapping of information from texture space to object space to image space.

The conceptual basis of the operation of texture processor 4 is depicted in FIG. 2, which shows transformation of texture information from texture space to object space, and mapping from object space to image space. The texture pattern shown in FIG. 2A is a simple mathematical definition of a grid pattern in a texture space defined by two-dimensional coordinate system (u,v). FIG. 2B depicts a three dimensional sample surface upon which the texture pattern of FIG. 2A is to be mapped. The surface of FIG. 2B is defined in an object space having three-dimensional coordinate system (x', Y', z'). The texture-mapping process transforms the texture pattern depicted in FIG. 2A onto the surface depicted in FIG. 2B, and maps the transformed texture information into display space, illustrated in FIG. 2C. The illustrated display space, corresponding to the image displayed by a monitor such as monitor 16 of FIG. 1, is defined by two-dimensional (x, y) coordinates.

FIG. 2A accordingly illustrates one possible texture pattern. Other texture patterns may be derived from digitized photographs or other input patterns.

Figure 3:
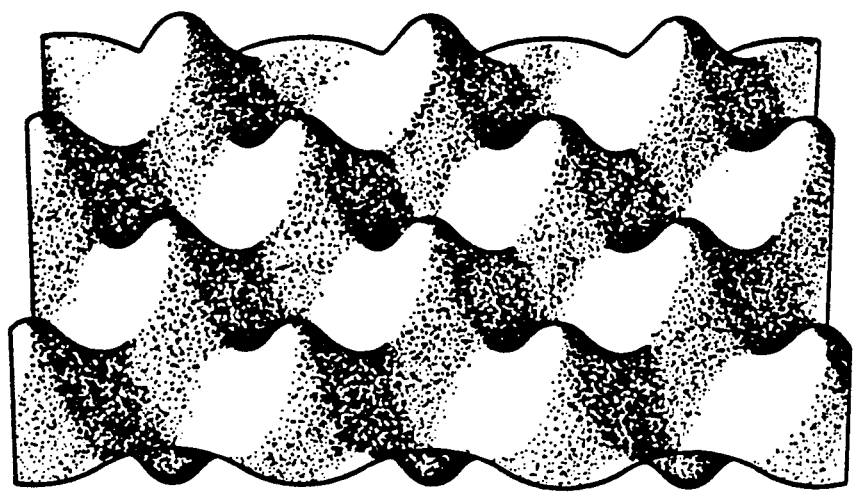
FIG. 3 depicts a computer graphics rendering of a surface without texture generated by the system of FIG. 1.
Figure 4:
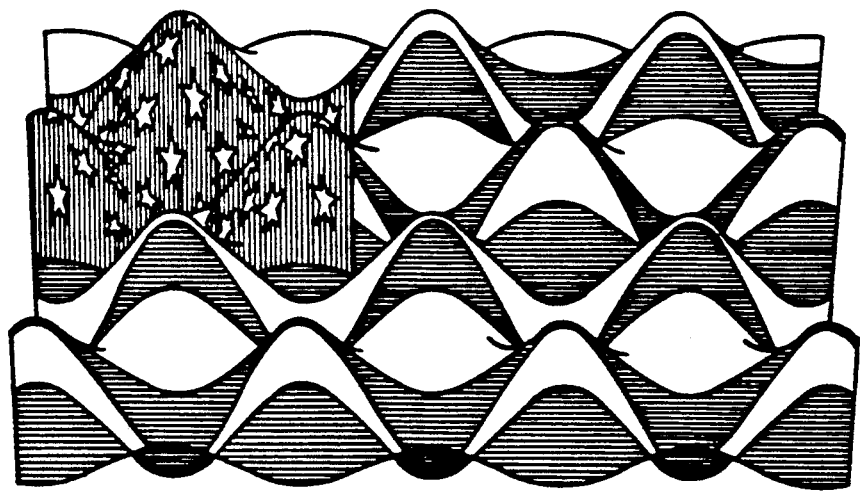
FIG. 4 depicts a surface with added texture information generated by the system of FIG. 1.

More complex surface and texture patterns are depicted in FIGS. 3 and 4. FIG. 3 depicts a computer rendered surface without texture. An image of this type can be generated by the apparatus described in U.S. patent application Ser. No. 077,202, attached hereto as Appendix A and incorporated herein by reference. FIG. 4 depicts the surface of FIG. 3 with a texture mapped flag pattern. The flag pattern is a texture, which texture processor 4 maps onto the surface shown in FIG. 3.

In accordance with the invention, however, texture processor 4 transforms texture information from texture space directly to image space, without the intermediate step of mapping information into object space in a manner discussed in greater detail in connection with FIG. 5.

Figure 5:
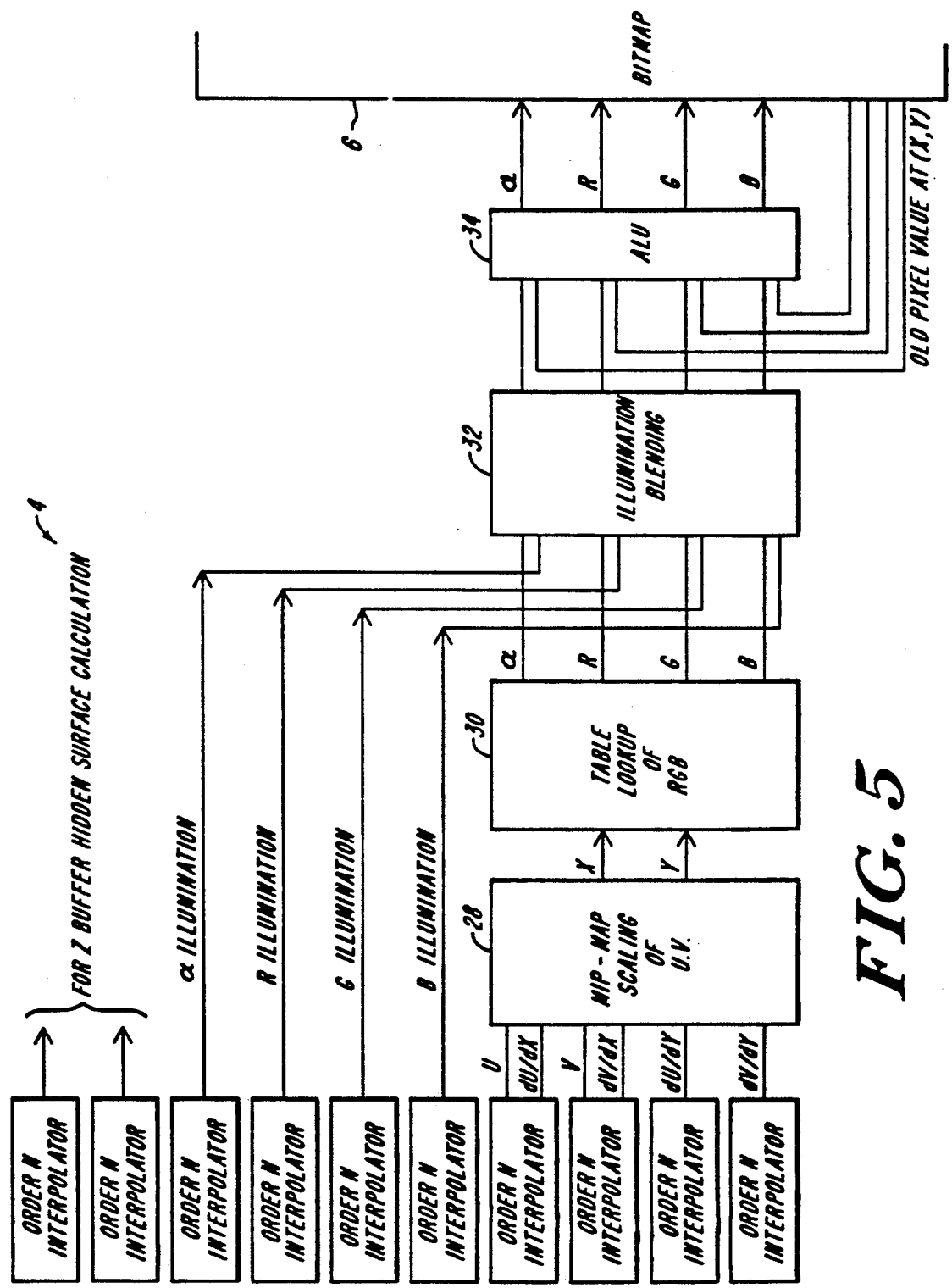
FIG. 5 is a block diagram giving detail of texture mapping apparatus according to the invention.

An embodiment of texture processor 4 is illustrated in greater detail in FIG. 5. The texture processor utilizes interpolators 18 to 27, scaling module 28, texture table 30, bitmap value multiplier 32 and arithmetic logic unit (ALU) 34.

Interpolators 18 to 27 are preferably constructed in accordance with principles disclosed in U.S. patent application Ser. No. 077,202, attached hereto as Appendix A and incorporated herein by reference. In particular, interpolators 18 to 27 preferably execute interpolation of order N, where N is less than or equal to 2. As illustrated in FIG. 5, interpolators 18 and 19 can, for example, generate values for use in conventional Z-buffer hidden surface calculations. Interpolators 20 to 23 can collectively form an illumination interpolation module for interpolating initial "set-up" data values to generate other illumination values. Interpolators 24-27 can collectively form a texture parameter interpolation module for interpolating initial "set-up" data values to generate texture parameter values U and V, and their derivatives dU/dX, dV/dX, dU/dY and dV/dY. The structure and operation of preferred interpolators are disclosed in U.S. Ser. No. 077,202, as is the use of initial, or "set-up" values.

An important feature of the invention is the use of interpolators to generate illumination values, texture Parameter values, and Z values from initial set-up values. This interpolation process eliminates the necessity of calculating illumination, texture, and Z values independently for each pixel in the display, and accordingly increases computational efficiency and speed.

Interpolators 20-23 generate $\alpha$, R, G, and B illumination values which are transmitted to one set of inputs of illumination blending module 32. Interpolators 24-27 generate U, dU/dX, V, dV/dX, dU/dY, and dV/dY signals transmitted to scaling block 28, which uses the signals to generate an X and Y address for a texture look-up table stored in lookup table module 30. The application of bitmap data value interpolators to generate signals representing partial derivatives is discussed in U.S. Ser. No. 077,202, attached hereto as Appendix A and incorporated herein by reference.

Texture table 30, in turn, provides α, R, G, and B texture values. Blending module 32 combines these texture values with the α, R, G, and B illumination values generated by interpolators 20-23, to yield final bitmap data values for writing into bitmap 6. In a preferred embodiment of the invention, ALU 34, which receives (X,Y) pixel value feedback from bitmap 6, executes arithmetic pixel combinations on the final bitmap data values.

Those skilled in the art will appreciate that FIG. 5 depicts only one possible embodiment of the invention, and that interpolators 18-27 can be allocated to execute interpolation functions other than those designated in FIG. 5. In particular, the apparatus can be configured so that a given interpolator will at certain times interpolate illumination values and at other times interpolate texture index values.

Figure 6:
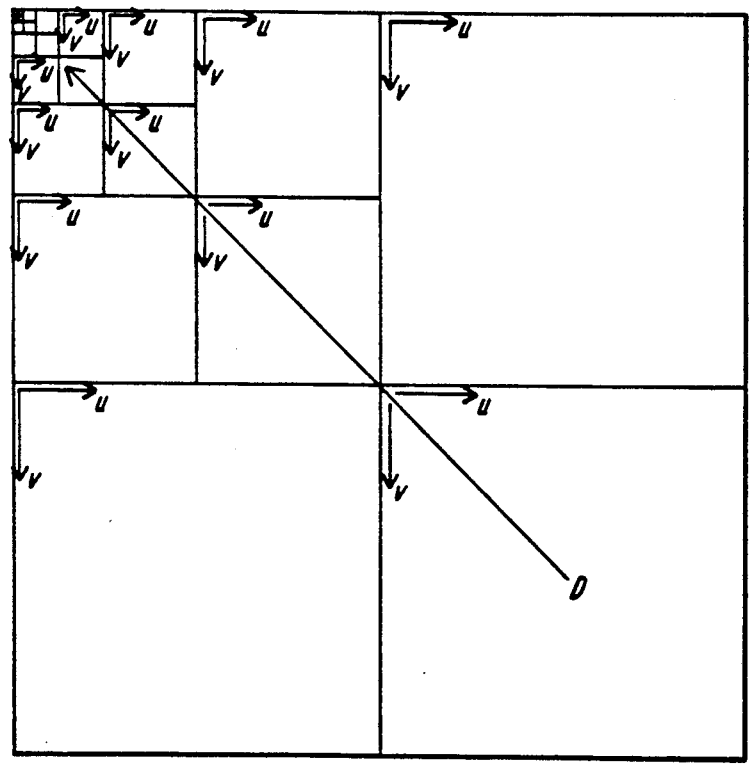
FIG. 6 depicts the information storage hierarchy of the texture table map of FIG. 5.

In a further preferred embodiment of the invention, texture table 30 is structured as a "mip-map." The hierarchy of a texture table 30 organized as a mip-map is illustrated in FIG. 6. A mip-map is a pyramidal data structure having indexed, differently scaled prefiltered mappings of stored values. The differently scaled mappings represent differently scaled versions of the same data.

In the mip-map illustrated in FIG. 6, U and V are the indexes, or spatial coordinates, of the map. D is a Parameter used to select between different levels—i.e. differently scaled mappings—of the pyramidal structure. Those skilled in the art will realize that corresponding points within different prefiltered maps can be addressed by a simple binary shift and add of an input set of index values U and V. The data at addresses in all the corresponding maps are therefore instantly available in response to the U, V input values. Mip-mapped data structures are described generally in Williams, *Pyramidal Parametrics.* Computer Graphics, Volume 17, No. 3, pp. 1-11, July 1983.

Thus, the U and V signals generated by interpolators 24 and 25, respectively, are the texture index values for mip-mapped texture table 30. In accordance with a preferred embodiment of the invention, scaling block 28 evaluates the partial derivatives of U and V with respect to X and Y (dU/dX, dV/dX, dU/dY, dV/dY), and utilizes the largest of the absolute values of the derivatives to select which size Pre-filtered texture table mapping will be addressed for generating texture values.

As a result of this configuration, if texture changes rapidly with respect to image space coordinates—i.e. large partial derivative with respect to X or Y—scalinq block 28 selects a mapping having a lower resolution of texture values. Conversely, when texture changes slowly with respect to image space coordinates, scaling block 28 selects a mapping having a greater resolution of texture values. Scaling block 28 then generates an X, Y index signal for addressing the selected texture table.

In another preferred embodiment of the invention, scaling block 28 evaluates the partial derivative signals. In response to the partial derivative signals, two registers in scaling block 28 limit the range of differently scaled mappings which can be selected for generating texture values, thereby reducing the level of computational and storage resources which must be allocated to texture mapping.

It will thus be seen that the invention efficiently attains the objects set forth above. In particular, the invention provides improved computer graphics texture mapping apparatus and methods which operate with high speed and enhanced computational efficiency.

It will be understood that changes may be made in the above construction and in the foregoing sequences of operation without departing from the scope of the invention. For example, apparatus according to the invention can be configured to map a three dimensional texture into image space. Alternatively, a single "monochrome" set of texture values can be applied to generate each final bitmap data value. It is accordingly intended that all matter contained in the above description or shown in the accompanying drawings be interpreted as illustrative rather than in a limiting sense.

It is also to be understood that the following claims are intended to cover all the generic and specific features of the invention as described herein, and all statements of the scope of the invention which, as a matter of language, might be said to fall therebetween.

Having described the invention, what is claimed as new and secured by Letters Patent is:

1. In a computer graphics display controller system for processing first electrical signals to generate electrical display signals to display an image of an object on an electrical display element, the image being defined by electrical display signals corresponding to selected display pixels of the image, the improvement comprising texture mapping apparatus comprising A. illumination signal generating means, including electrical logic elements, responsive to selected addresses corresponding to selected display pixels, for generating electrical illumination signals representative of illumination values corresponding to respective ones of said display pixel addresses, B. texture index signal generating means, including electrical logic elements, responsive to said selected pixel addresses, for generating an electrical texture index signal representative of a texture index value for each said selected pixel address, each said texture index value being associated with a respective texture value for each said selected pixel address, said electrical texture signals being storable in an electrical storage element including a texture table addressable by said texture index signals, said texture index signal generating means including texture index signal interpolation elements for interpolating initial texture index signals to generate further texture index signals, said initial texture index signals corresponding to initial pixel addresses and said further texture index signals corresponding to further pixel addresses, C. electrical combining means, including combinatorial logic elements, in electrical communication with said illumination signal means and said texture index signal generating means, responsive to said illumination signals and said texture signals, for electrically combining respective ones of said illumination signals and said texture signals to generate electrical display signals corresponding to said selected pixels, for application to the display element to display the image, and D. electrical output means, in electrical communication with said electrical combining means, and electrically connectable to the display device, for transmitting said electrical display signals to the display device to display said image representative of an object.

2. Apparatus according to claim 1, wherein said illumination value means includes illumination value interpolation means for interpolating initial illumination values to generate further illumination values.

3. Apparatus according to claim 2, wherein said polynomial logic means includes means for calculating polynomials of less than or equal to order two.

4. Apparatus according to claim 3, wherein said polynomial logic means includes incremental evaluation means for executing incremental evaluation of said polynomials.

5. Apparatus according to claim 4, wherein said incremental evaluation means includes forward differencing means for evaluating said selected polynomials.

6. Apparatus according to claim 3, wherein said polynomial logic means includes non-incremental evaluation means for executing non-incremental evaluation of said selected polynomials.

7. Apparatus according to claim 6, wherein said non-incremental evaluation means includes means for executing direct evaluation of said selected polynomials.

8. Apparatus according to claim 6, wherein said non-incremental evaluation means includes means for executing spline functions utilizing values of selected control points.

9. Apparatus according to claim 1, wherein said illumination value means and said polynomial logic means collectively include at least one interpolator means for (i) interpolating said illumination values during selected operational periods and (ii) interpolating said texture index values during other operational periods.

10. In a computer graphics display controller system for processing first electrical signals to generate electrical display signals to display an image of an object on a display element, the image being defined by electrical display signals corresponding to selected display pixels of the image, the improvement comprising
texture mapping apparatus comprising
A. illumination signal generating means, including electrical logic elements, responsive to selected addresses corresponding to selected display pixels, for generating electrical illumination signals representative of illumination values corresponding to respective ones of said display pixel addresses,
B. texture table means including an electrical storage element for storing texture signals representative of texture values, said texture table means being addressable by electrical texture index signals, said texture index signals being representative of values of polynomial functions of said selected pixel addresses, said texture table means further including
interpolation means, including electrical interpolator elements, for interpolating first texture index signals representative of initial values of said polynomial functions to generate further texture index signals representative of further values of said polynomial functions, said initial values of said polynomial functions corresponding to initial display pixel addresses and said further values of said polynomial functions corresponding to further display pixel addresses, and
electrical mip-map storage means for retrievably storing indexed, differently scaled mappings of said testures signals, said differently scaled mappings being selected by at least one of said signals representative of interpolated values of said polynomial functions,
C. electrical combining means, including combinatorial logic elements, in electrical communication with said illumination signal means and said texture table means, for electrically combining respective ones of said illumination signals and said texture signals associated with a selected one of said differently scaled mappings to generate display signals corresponding to said selected pixels, for application to the display element to display the image, and
D. output means, in electrical communication with said electrical combining means, and electrically connectable to the display device, for transmitting said electrical display signals to the display device to display said image representative of an object.

11. In a computer graphics display controller system for processing first electrical signals to generate digital electrical display signals to display an image of an object on a display element, the image being defined by electrical display signals corresponding to selected display pixels of the image, the improvement comprising
texture mapping apparatus comprising
A. illumination signal generating means, including logic elements, responsive to selected addresses corresponding to selected display pixels, for generating electrical illumination signals representative of illumination values corresponding to respective ones of said display pixel addresses,
B. texture table means, including an electrical storage element for storing texture signals, said texture table storage means being addressable by electrical texture index signals having values representative of polynomial functions of said selected pixel addresses, said texture table means including
electrical mip-map storage means for retrievably storing indexed, differently scaled mappings of said texture signals, said differently scaled mapping being selected by at least one of said texture index signals,
C. electrical combining means, including combinatorial logic elements, in electrical communication with said illumination signal means and said texture table means, for electrically combining respective ones of said illumination signals and said texture signals associated with a selected one of said differently scaled mappings to generate display signals corresponding to said selected pixels, for application to the display element to display the image,
D. partial derivative means, including electrical logic elements, in electrical communication with said texture table means, for generating electrical signals representative of partial derivatives of said at least one texture index signal with respect to said selected pixel addresses, and
F. scaling means, including electrical logic elements, in electrical communication with said partial derivative means and said texture table means, for selecting, responsive to said signals representative of partial derivatives, one of said mappings of said texture values for transmitting texture values to said combining means, and
G. output means, in electrical communication with said electrical combining means, and electrically connectable to the display device, for transmitting said electrical display signals to the display device to display said image representative of an object.

12. Apparatus according to claim 11, wherein said texture table means includes limiting means for selectively limiting the range of differently scaled mappings selectable by values of at least one said partial derivative.

* * * * *